(12) United States Patent
Reed

(10) Patent No.: US 8,150,762 B1
(45) Date of Patent: *Apr. 3, 2012

(54) SYSTEM AND METHOD FOR PROVIDING CREDIT

(75) Inventor: Daniel Reed, Boerne, TX (US)

(73) Assignee: United Services Automobile Association, San Antonio, TX (US)

( * ) Notice: Subject to any disclaimer, the term of this patent is extended or adjusted under 35 U.S.C. 154(b) by 328 days.

This patent is subject to a terminal disclaimer.

(21) Appl. No.: 11/322,137

(22) Filed: Dec. 29, 2005

(51) Int. Cl.
*G06Q 40/00* (2006.01)

(52) U.S. Cl. .......................... 705/38; 705/35

(58) Field of Classification Search .............. 705/35, 705/38
See application file for complete search history.

(56) References Cited

U.S. PATENT DOCUMENTS

| | | | | |
|---|---|---|---|---|
| 5,231,569 A | * | 7/1993 | Myatt et al. | 705/38 |
| 6,088,686 A | * | 7/2000 | Walker et al. | 705/38 |
| 6,119,103 A | * | 9/2000 | Basch et al. | 705/35 |
| 6,226,623 B1 | * | 5/2001 | Schein et al. | 705/35 |
| 6,405,181 B2 | * | 6/2002 | Lent et al. | 705/38 |
| 6,999,569 B2 | | 2/2006 | Risafi et al. | |
| 2001/0042785 A1 | | 11/2001 | Walker et al. | |
| 2001/0047307 A1 | * | 11/2001 | Bennett et al. | 705/26 |
| 2002/0023051 A1 | * | 2/2002 | Kunzle et al. | 705/38 |
| 2002/0156723 A1 | * | 10/2002 | Lilly et al. | 705/38 |
| 2003/0212790 A1 | * | 11/2003 | Thambidurai et al. | 709/225 |
| 2005/0145691 A1 | | 7/2005 | Dillard | |
| 2006/0036484 A1 | | 2/2006 | Voticky | |

FOREIGN PATENT DOCUMENTS

| | | | |
|---|---|---|---|
| WO | WO 99/59084 | * | 5/1999 |
| WO | WO 00/05666 | * | 2/2000 |
| WO | WO 01/63520 | * | 8/2001 |
| WO | WO 01/65398 | * | 9/2001 |
| WO | WO 02/23431 | * | 3/2002 |
| WO | WO 2005/022348 | * | 3/2005 |

* cited by examiner

*Primary Examiner* — Sarah Monfeldt
(74) *Attorney, Agent, or Firm* — Perkins Coie LLP

(57) ABSTRACT

Disclosed are systems and methods for providing credit. The systems and methods receive a credit request from a applicant, determine immediately whether or not credit will be provided to the applicant and, if so, provide an immediately usable general use credit account to the applicant.

18 Claims, 10 Drawing Sheets

SYSTEM AND METHOD FOR PROVIDING CREDIT

This application is related to 1) U.S. application Ser. No. 11/321,859 filed on Dec. 29, 2005, and 2) U.S. application Ser. No. 11/322,136 filed Dec. 29, 2005, which are incorporated herein by reference in their entirety.

TECHNICAL FIELD

Various embodiments of the present disclosure pertain to a system and method for providing credit.

BACKGROUND

The provision of a credit account to a applicant is well-known and readily appreciated by those of skill in the art. Typically, an applicant will request a credit account from a credit provider using an application. These credit applications do not result in an immediately usable general use credit account, rather, there is either a period of time which must pass for a general use credit account to issue and be activated, or else the credit account will not be general use but will rather have restrictions on its use. The period of time between the request and the issuance of a general use credit account raises a number of issues.

Due to the period of time between the request for and the issuance of the general use credit account, the applicant is not provided the convenience of immediate use of the credit account. Furthermore, the period of time between the request for and the issuance of the general use credit account foregoes the opportunity to immediately cross-sell goods and services to the applicant using the general use credit account.

Accordingly, it would be desirable to provide such a system and method for providing credit.

SUMMARY

Various embodiments of the present disclosure are directed to systems and methods for providing credit. The systems and methods provide techniques for receiving a credit request from an applicant, determining immediately whether or not credit will be provided to the applicant and, if so, providing an immediately usable general use credit account to the applicant.

BRIEF DESCRIPTION OF THE DRAWINGS

FIG. 1b is a schematic view illustrating an embodiment of an information handling system used with the system for providing credit of FIG. 1a.

FIG. 2 is a schematic view illustrating an embodiment of a provider used in the system for providing credit of FIG. 1a.

DETAILED DESCRIPTION

Figure 1A:
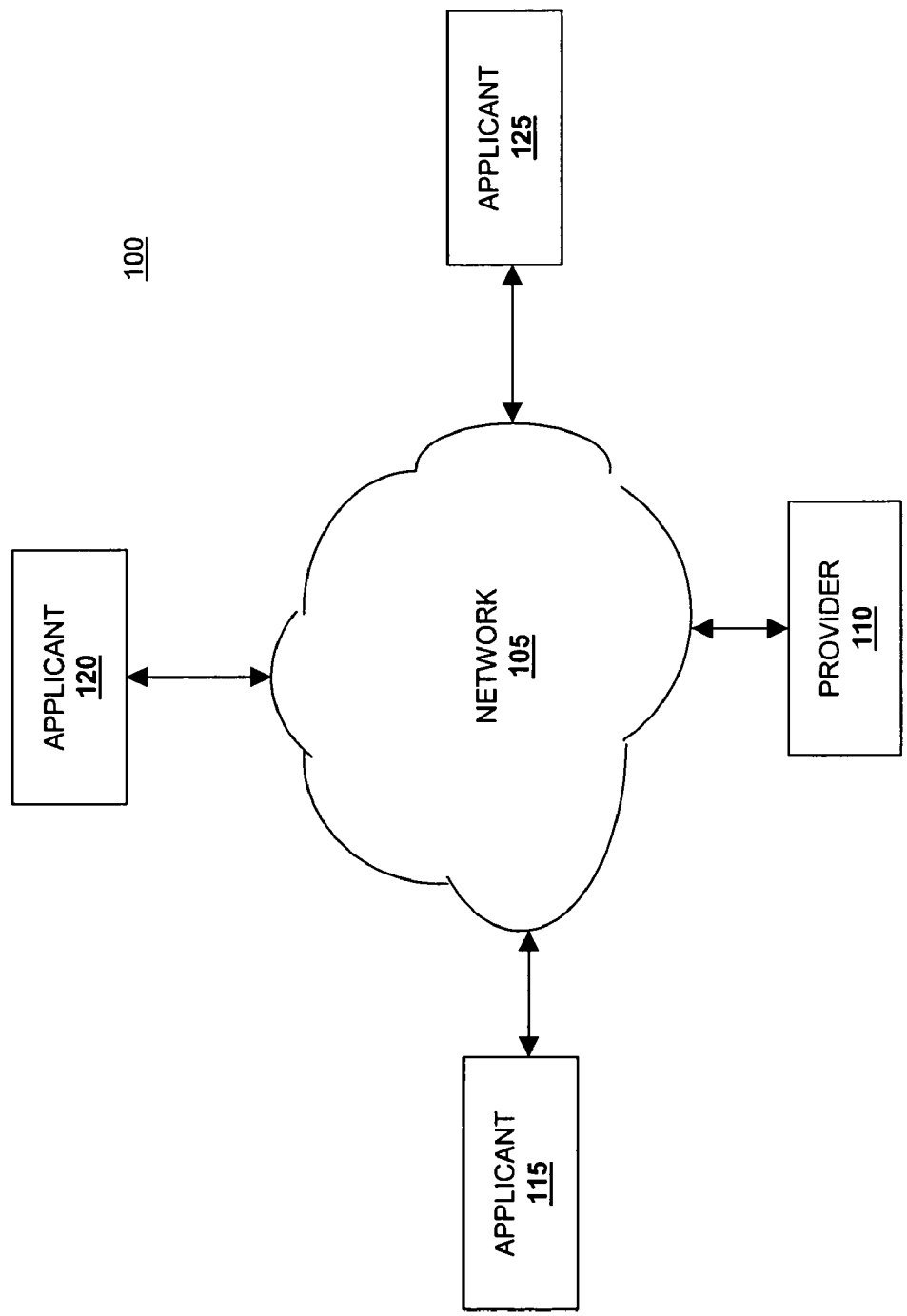
FIG. 1a is a schematic view illustrating an embodiment of a system for providing credit.

Referring now to FIG. 1a, in one embodiment, a system for providing credit 100 is illustrated. The system 100 includes a computer network 105 such as, for example, a Transport Control Protocol/Internet Protocol (TCP/IP) network (e.g., the internet or an intranet.) A provider 110 is operably coupled to the network 105. A plurality of applicants 115, 120, and 125 are also operably coupled to the network 105 in order to allow communication between the applicants 115, 120, and 125 and the provider 110.

Each of the provider 110 and the applicants 115, 120, and 125 includes a respective network interface for communicating with the network 105 (e.g., outputting information to, and receiving information from, the network 105), such as by transferring information (e.g., instructions, data, signals) between such applicants and the network 105. Accordingly, through the network 105, the provider 110 communicates with the applicants 115, 120, and 125, and the applicants 115, 120, and 125 communicate with the provider 110.

For clarity, FIG. 1a depicts only one provider 110. However, the system 100 may include a plurality of providers which are substantially identical to the provider 110 and each other. Likewise, for clarity, FIG. 1a depicts only three applicants 115, 120, and 125. However, the system 100 may include a plurality of applicants which are substantially identical to the applicants 115, 120, and 125 and each other. In the discussion below, the applicant 115 is a representative one of the applicants 115, 120, and 125.

Each of the provider 110 and the applicants 115, 120, and 125 includes a respective information handling system (IHS), a subsystem, or a part of a subsystem for executing processes and performing operations (e.g., processing or communicating information) in response thereto, as discussed further below. Each such IHS is formed by various electronic circuitry components. Moreover, as illustrated in FIG. 1a, such IHS's may be coupled to each other. Accordingly, the provider 110 and the applicants 115, 120, and 125 operate within the network 105.

An IHS is an electronic device capable of processing, executing or otherwise handling information. Examples of an IHS include a server computer, a personal computer (e.g., a desktop computer or a portable computer such as, for example, a laptop computer), or a handheld computer. Examples of an IHS also include a router, a switch and other devices coupled to a network (e.g. the network 105).

Figure 1B:
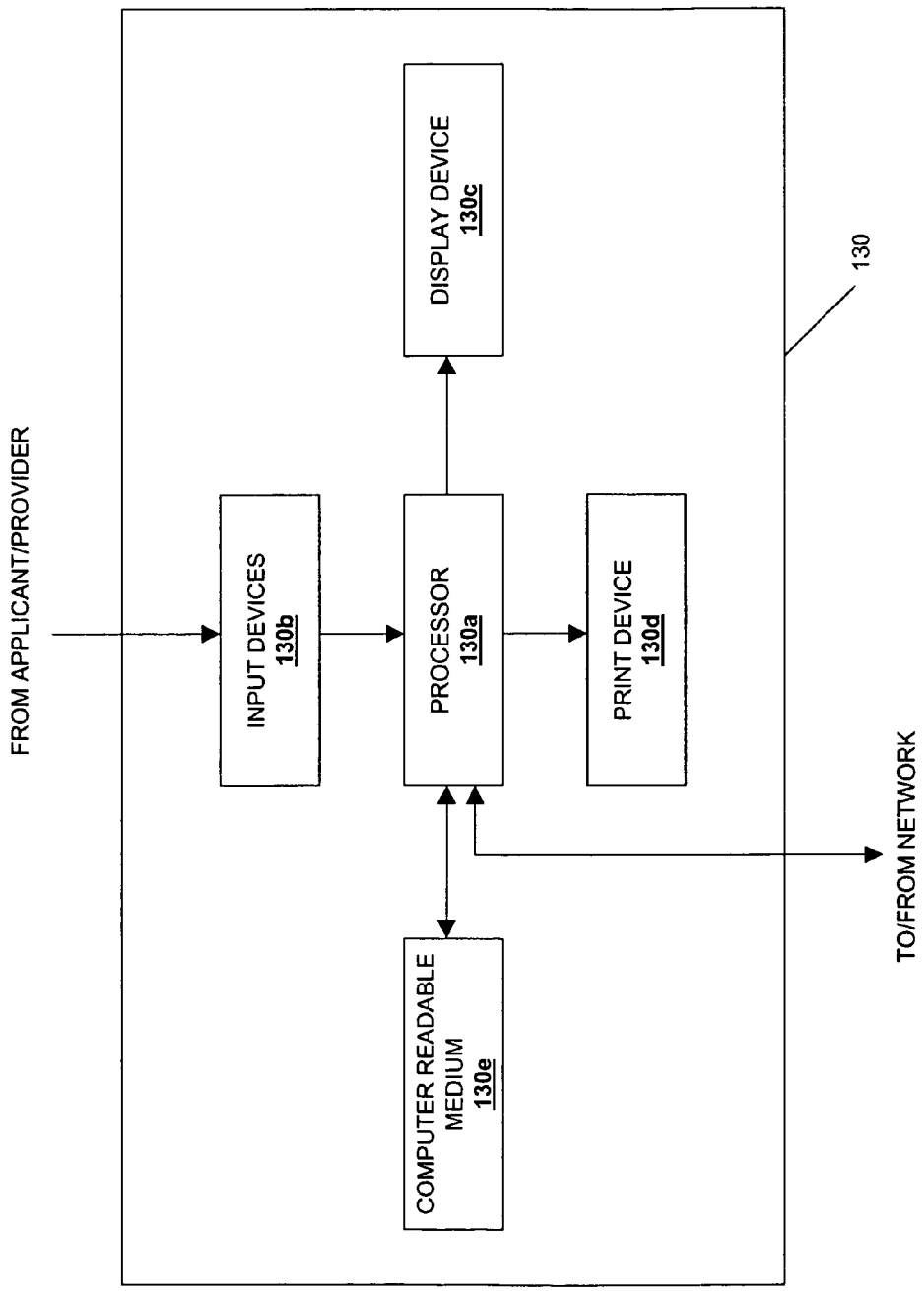

Referring now to FIG. 1b, an IHS 130 which is representative of one of the IHS's described above, is illustrated. The IHS 130 may include any or all of the following: (a) a processor 130a for executing and otherwise processing instructions, (b) a plurality of input devices 130b, which are operably coupled to the processor 130a, for inputting information, (c) a display device 130c (e.g., a conventional electronic cathode ray tub (CRT) device or a conventional liquid crystal display (LCD)), which is operably coupled to the processor 130a, for displaying information, (d) a print device 130d (e.g. a conventional electronic printer or plotter), which is operably coupled to the processor 130a, for printing visual images (e.g., textual or graphic information on paper), (e) a computer-readable medium 130e, which is operably coupled to the processor 130a, for storing information, as discussed further below, and (f) various other electronic circuitry for performing other operations of the IHS 130 known in the art.

For example, the IHS 130 includes (a) a network interface (e.g., circuitry) for communicating between the processor 130a and the network 105 and (b) a memory device (e.g., random access memory (RAM) device or read only memory (ROM) device for storing information (e.g., instructions executed by processor 130a and data operated upon by processor 130a in response to such instructions)). Accordingly the processor 130a is operably coupled to the network 105, the input devices 130b, the display device 130c, the print device 130d, and the computer-readable medium 130e, as illustrated in FIG. 1b.

For example, in response to signals from the processor 130a, the display device 130c displays visual images. Information may be input to the processor 130a from the input devices 130b, and the processor 130a may receive such information from the input devices 130b. Also, in response to signals from the processor 130a, the print device 130d prints visual images on paper.

The input devices include a variety of input devices known in the art such as, for example, a conventional electronic keyboard and a pointing device such as, for example, a conventional electronic "mouse", rollerball, or light pen. The keyboard may be operated to input alphanumeric text information to the processor 130a, and the processor 130a may receive such alphanumeric text information from the keyboard. The pointing device may be operated to input cursor-control information to the processor 130a, and the processor 130a may receive such cursor control information from the pointing device.

The computer-readable medium 130e and the processor 130a are structurally and functionally interrelated with one another as described below in further detail. Each IHS of the illustrative embodiment is structurally and functionally interrelated with a respective computer-readable medium, similar to the manner in which the processor 130a is structurally and functionally interrelated with the computer-readable medium 130e. In that regard, the computer-readable medium 130e is a representative one of such computer-readable media including, for example, but not limited to, a hard disk drive.

The computer-readable medium 130e stores (e.g., encodes, records, or embodies) functional descriptive material (e.g., including but not limited to software (also referred to as computer programs or applications) or data structures). Such functional descriptive material imparts functionality when encoded on the computer-readable medium 130e. Also, such functional descriptive material is structurally and functionally interrelated to the computer-readable medium 130e.

With such functional descriptive material, data structures define structural and functional interrelationships between such data structures and the computer-readable medium 130e (and other aspects of the system 100). Such interrelationships permit the data structures' functionality to be realized. Also, within such functional descriptive material, computer programs define structural and functional interrelationships between such computer programs and the computer-readable medium 130e (and other aspects of the system 100). Such interrelationships permit the computer programs' functionality to be realized.

For example, the processor 130a reads (e.g., accesses or copies) such functional descriptive material from the computer-readable medium 130e onto the memory device of the IHS 130, and the IHS 130 (more particularly, the processor 130a) performs its operations (as described elsewhere herein) in response to such material which is stored in the memory device of the IHS 130. More particularly, the processor 130a performs the operation of processing a computer application (that is stored, encoded, recorded, or embodied on a computer-readable medium) for causing the processor 130a to perform additional operations (as described elsewhere herein). Accordingly, such functional descriptive material exhibits a functional interrelationship with the way in which processor 130a executes its processes and performs its operations.

Further, the computer-readable medium 130e is an apparatus from which the computer application is accessible by the processor 130a, and the computer application is processable by the processor 130a for causing the processor 130a to perform such additional operations. In addition to reading such functional descriptive material from the computer-readable medium 130e, the processor 130a is capable of reading such functional descriptive material from (or through) the network 105 which is also a computer-readable medium (or apparatus). Moreover, the memory device of the IHS 130 is itself a computer-readable medium (or apparatus).

Figure 2:
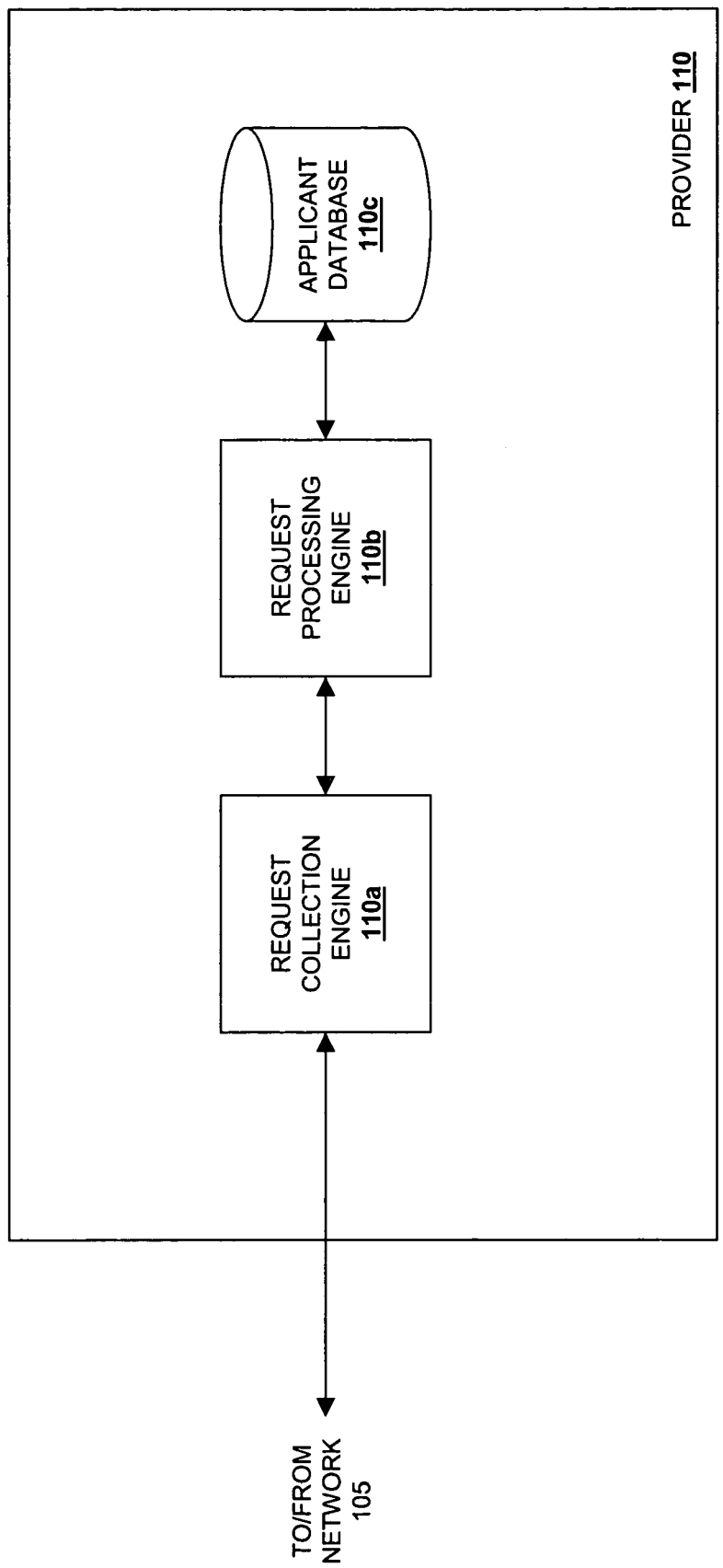

Referring now to FIG. 2, the provider 110 is illustrated in more detail. A request collection engine 110a which may be, for example, stored on a computer-readable medium known in the art, is included in the provider 110 and is operably coupled to the network 105, described above with reference to FIG. 1. A request processing engine 110b, which may be, for example, stored on a computer-readable medium known in the art, is included in the provider 110 and is operably coupled to the request collection engine 110a. An applicant database 110c is included in the provider 110 and is operably coupled to the request processing engine 110b and the request collection engine 110a. In an embodiment, the applicant database 110c may be located outside of the provider 110 and still operably coupled to the provider 110, the request processing engine 110b, and the request collection engine 110a.

Figure 3:
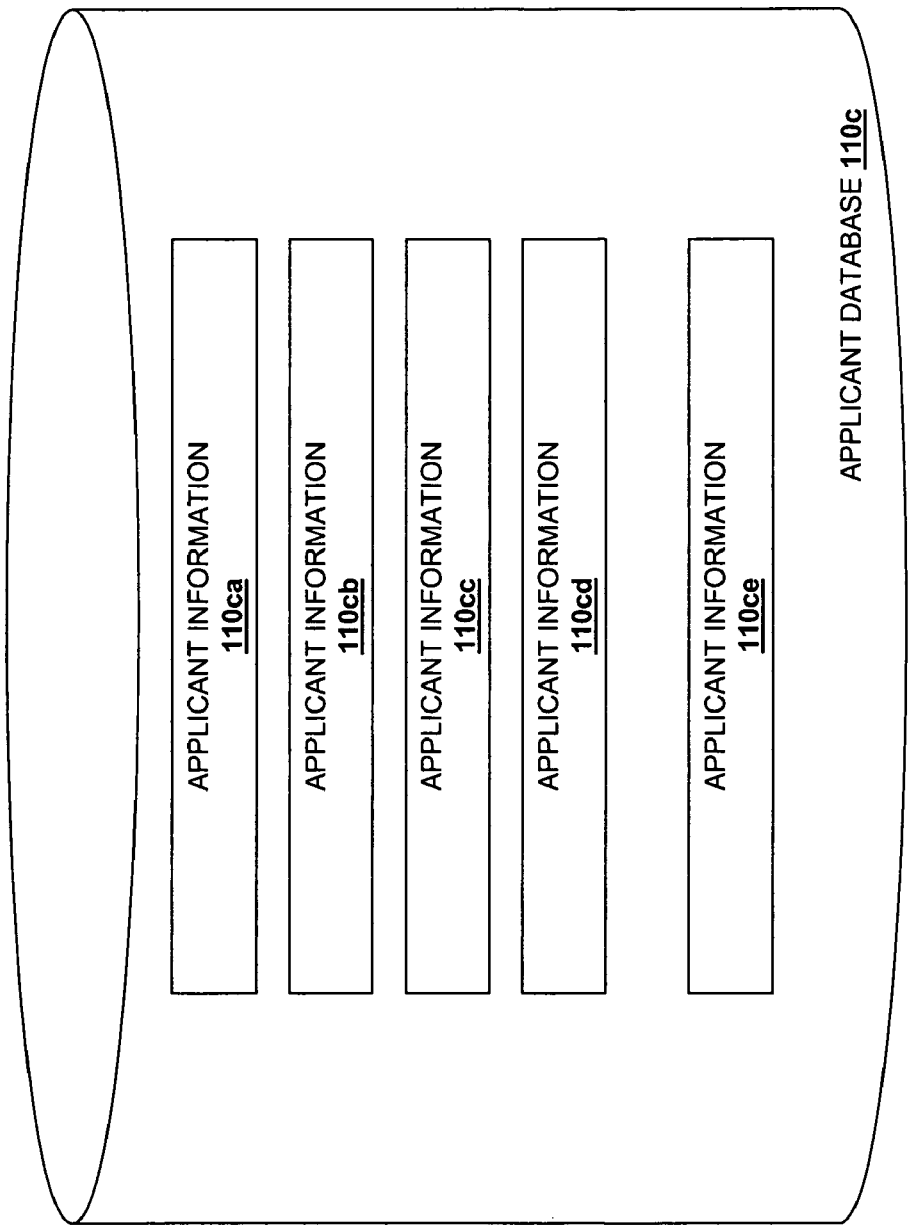
FIG. 3 is a schematic view illustrating an embodiment of an applicant database used in the provider of FIG. 2.

Referring now to FIGS. 1 and 3, the applicant database 110c is illustrated in more detail. The applicant database 110c includes a plurality of applicant information such as, for example, the applicant information 110ca, 110cb, 110cc, 110cd, and 110ce. In an embodiment, the applicant information 110ca, 110cb, 110cc, 110cd, and 110ce includes previously collected information on one or all of the applicants 115, 120, and 125, described above with reference to FIG. 1a. In an embodiment, applicants such as, for example, the applicants 115, 120, and 125, described above with reference to FIG. 1a, may be part of a membership organization including the provider 110 and the applicant information 110ca, 110cb, 110cc, 110cd, and 110ce is collected during previous interactions between the provider 110 and the applicants. In an embodiment, the applicant information 110ca, 110cb, 110cc, 110cd, and 110ce includes information such as, for example, the identity of the applicant, the fraud history of the applicant, the credit worthiness of the applicant, the total debt of the applicant, the income tier of the applicant, and a variety of other conventional credit information known in the art.

Figure 4A:
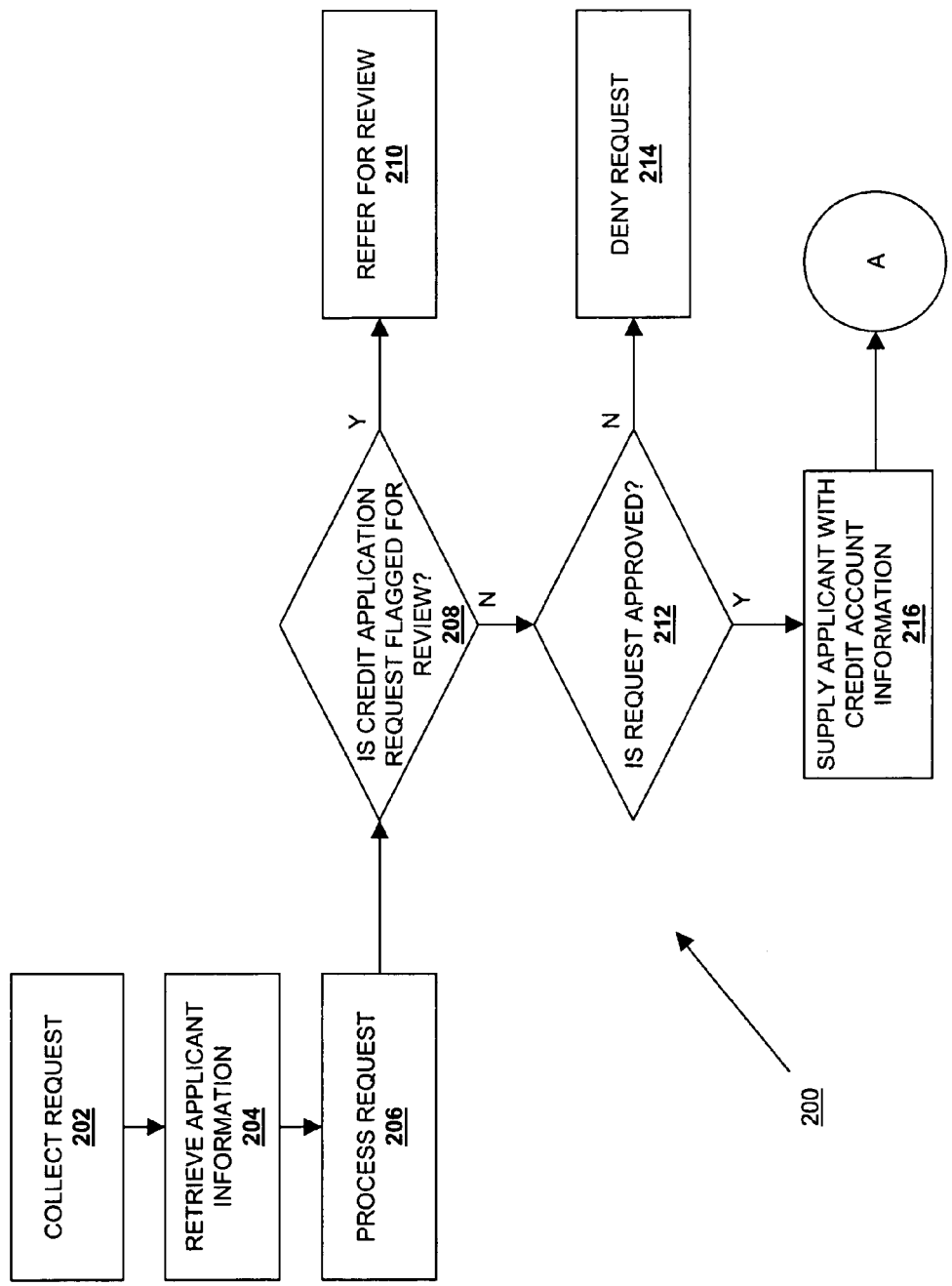
FIG. 4a is a flow chart illustrating an embodiment of a portion of a method for providing credit.

Referring now to FIGS. 1a, 2, and 4a, a method 200 for providing credit is illustrated. The method 200 begins at step 202, where a credit request is collected. An applicant such as, for example, the applicant 115, submits a credit request application which is received by the request collection engine 110a in the provider 110. In an embodiment, the applicant 115 may have been communicating with an entity other than the provider 110 and that entity may have directed the applicant 115 to the provider in order to acquire a credit account with which to purchase good products and/or services provided by the entity. The receipt of the credit request application by the request collection engine 110a begins a credit application session between the provider 110 and the applicant 115. In an embodiment, the request collection engine 110a may provide the credit request application to the applicant 115 through the network 105. In an embodiment, the request collection engine 110a may access the applicant database 110c in order to determine whether the applicant database 110c includes previously collected information on the applicant 115 and, if so, the request collection engine 110a may retrieve that information and populate the credit request application with the information retrieved. In an embodiment, the credit request application may be received from the applicant 115 by the provider 110 over a phone network and provided to the request collection engine 110a by the provider 110.

The method 200 then proceeds to step 204 where applicant information such as, for example, the applicant information 110ca, 110cb, 110cc, 110cd, and 110ce, described above with respect to FIG. 3, is retrieved. The credit request application is transferred from the request collection engine 110a to the request processing engine 110b. The request processing engine 110b then accesses the applicant database 110c in order to determine whether the applicant database 110c includes previously collected information on the applicant 115 and, if so, the request collection engine 110a retrieves that information for use in step 206 of the method 200.

Referring now to FIGS. 1a, 2, 4a, 4b, and 4c, the method 200 then proceeds to step 206 where the credit request application is processed. The information provided by the applicant 115 in the credit request application and any information about the applicant 115 which may have been retrieved from the applicant database 110c in step 204 of the method 200 are processed through a series of rules. In an embodiment, those rules include a plurality of applicant eligibility rules 206a which determine, for example, whom is eligible to apply for a general use credit account. In an embodiment, those rules include a plurality of credit worthiness rules 206b which determine, for example, what credit application requests may be approved and under what circumstances they may be approved. In an embodiment, those rules include a plurality of repayment capacity rules 206c which determine, for example, the debt to income ratio of the applicant. In an embodiment, those rules include a plurality of fraud rules 206d which determine, for example, which credit application requests need to be analyzed for fraud. In an embodiment, those rules include a plurality of credit line assignment rules 206e which determine, for example, the amount of credit the applicant is eligible for. In an embodiment, those rules include a plurality of review rules 206f which determine, for example, whether a credit application request needs to be sent for review. In an embodiment, those rules include a plurality of pricing rules 206g which determine, for example, the pricing of the general use credit account. In an embodiment, those rules include a plurality of decision authority rules 206h which determine, for example, who should and should not approve specific credit application requests. In an embodiment, those rules include a plurality of user approval authorization check rules 206i which determine, for example, whether the credit application request may be approved by an underwriter. In an embodiment, the processing of the information provided by the applicant 115 in the credit request application and any information about the applicant 115 which may have been retrieved from the applicant database 110c allows the request processing engine 110b to determine whether to approve the credit request application, to deny the credit request application, or refer the credit request application for review.

The method 200 then proceeds to step 206a where the information provided by the applicant 115 in the credit request application and any information about the applicant 115 which may have been retrieved from the applicant database 110c in step 204 of the method 200 are run through the plurality of applicant eligibility rules. In an embodiment, the applicant 115 must be 18 years of age in order for the credit request application to not be denied. In an embodiment, the applicant 115 must have a primary address in a non-restricted country in order for the credit request application to not be denied. In an embodiment, the applicant 115 must have a social security number in the applicant database 110c in order for the credit request application to not be denied. In an embodiment, the applicant 115 must have a date of birth in the applicant database 110c in order for the credit request application to not be denied.

The method 200 then proceeds to step 206b where the information provided by the applicant 115 in the credit request application and any information about the applicant 115 which may have been retrieved from the applicant database 110c in step 204 of the method 200 are run through the plurality of credit worthiness rules. In an embodiment, the credit worthiness rules vary depending on the category the applicant 115 falls under such as, for example, a pre-commission program, a college program, and/or a provider pre-approval program. In an embodiment, the applicant 115 may not fall under any of the categories listed above. In an embodiment, if the applicant 115 is in a pre-commission program, the applicants 115 card mailing address and statement mailing address must not be in a restricted country, the applicant 115 must not have caused the provider 110 a prior loss, the applicants 115 credit score must be 600 or greater, the applicant 115 must be a United States citizen, and the applicant 115 must not have payment past due delinquencies, bankruptcy or wage earner plans, foreclosure, repossession, collection, or judgments in order for the credit request application to not be denied. In an embodiment, if the applicant 115 is in a college program, the applicants 115 card mailing address and statement mailing address must not be in a restricted country, the applicant 115 must not have caused the provider 110 a prior loss, the applicants 115 credit score must be 600 or greater, the applicant 115 must be a United States citizen, and the applicant 115 must not have payment past due delinquencies, bankruptcy or wage earner plans, foreclosure, repossession, collection, or judgments in order for the credit request application to not be denied. In an embodiment, if the applicant 115 is in a provider pre-approval program, the applicants 115 card mailing address and statement mailing address must not be in a restricted country, the applicant 115 must not have caused the provider 110 a prior loss, the applicants 115 credit score must be 580 or greater, the applicant 115 must be a United States citizen, and the applicant 115 must not have payment past due delinquencies, bankruptcy or wage earner plans, foreclosure, repossession, collection, or judgments in order for the credit request application to not be denied. In an embodiment, if the applicant 115 does not fall under any of the categories, the applicants 115 card mailing address and statement mailing address must not be in a restricted country, the applicant 115 must not have caused the provider 110 a prior loss, the applicant 115 must either be Bank P&C and their credit score must be 630 or greater or non-Bank P&C and their credit score must be 660 or greater, the applicant must not be a student, unemployed, or employed, self employed, or in the military for less than 1 year, the applicant 115 must be a United States citizen, and the applicant 115 must not have payment past due delinquencies, bankruptcy or wage earner plans, foreclosure, repossession, collection, or judgments in order for the credit request application to not be denied.

The method 200 then proceeds to step 206c where the information provided by the applicant 115 in the credit request application and any information about the applicant 115 which may have been retrieved from the applicant database 110c in step 204 of the method 200 are run through the plurality of repayment capacity rules. In an embodiment, the repayment capacity rules vary depending on the category the applicant 115 falls under such as, for example, a pre-commission program, a college program, and/or a provider pre-approval program. In an embodiment, the applicant 115 may not fall under any of the categories listed above. In an embodiment, if the applicant 115 falls under a pre-commission program, a college program, and/or a provider pre-approval program, the credit request application is not denied. In an embodiment, if the applicant 115 does not fall under any of the categories, the credit request application is denied if the applicants 115 debt to income ratio is greater than 55%.

The method 200 then proceeds to step 206d where the information provided by the applicant 115 in the credit request application and any information about the applicant 115 which may have been retrieved from the applicant database 110c in step 204 of the method 200 are run through the plurality of fraud rules. In an embodiment, if the card mailing or primary address zip code is high risk, the credit application request is marked a fraud risk. In an embodiment, if the card mailing address or primary address is foreign, the credit application request is marked a fraud risk. In an embodiment, if the primary address effective date is less than 30 days prior to or less than 10 days after the receiving of the credit request application by the provider 110, the credit request application is marked a fraud risk. In an embodiment, if the card mailing address is different than the primary address, the credit request application is marked a fraud risk. In an embodiment, if a provider service representative, underwriter, or fraud analyst suspect the applicant 115 is falsely identifying themselves, the credit request application is marked a fraud risk. In an embodiment, if the applicant 115 credit report has a fraud alert, the credit request application is marked a fraud risk. In an embodiment, if the applicant 115 credit report has an identity theft tag, the credit request application is marked a fraud risk. In an embodiment, if the applicant 115 credit report social security number does not match the applicants 115 social security number provided in the credit request application, the credit request application is marked a fraud risk. In an embodiment, if the applicant 115 credit report has a Fair and Accurate Credit Transactions (FACT) Act alert, the credit request application is marked a fraud risk. In an embodiment, the FACT Act alert is a consumer placed fraud alert on the consumer credit report. In an embodiment, if the applicant 115 credit report has a deceased alert, the credit request application is marked a fraud risk. In an embodiment, if the applicants 115 home phone number, work phone number, other phone number, primary address, or card mailing address is in an internal fraud database, the credit request application is marked a fraud risk. In an embodiment, if applicant 115 has not been a member of the providers 110 membership organization for at least 90 days before the credit request application, the credit request application is marked a fraud risk. In an embodiment, if the applicant 115 is not Bank Property and Casualty eligible, the credit request application is marked a fraud risk. In an embodiment, Bank Property and Casualty eligibility is only provided to members of the providers 110 membership organization and ensures the provider 110 that the applicant 115 is not a fraud risk. In an embodiment, if any of the applicants 115 existing credit card accounts are coded as lost, frozen, or authorization prohibited, the credit request application is marked a fraud risk.

The method 200 then proceeds to step 206e where the information provided by the applicant 115 in the credit request application and any information about the applicant 115 which may have been retrieved from the applicant database 110c in step 204 of the method 200 are run through the plurality of credit line assignment rules. In an embodiment, the credit line assignment rules vary depending on the category the applicant 115 falls under such as, for example, a pre-commission program, a college program, and/or a provider pre-approval program. In an embodiment, the applicant 115 may not fall under any of the categories listed above.

In an embodiment, if the applicant 115 is in a pre-commission program and in a military academy, the qualified amount varies depending on the applicants 115 classification such as, for example: $500 for $1^{st}$ class, $1000 for $2^{nd}$ class, $1500 for $3^{st}$ class, $2000 for $4^{th}$ class, and $2500 for an officer. In an embodiment, if the applicant 115 is in a pre-commission program and in an Officers Candidate School/Officers Training School (OCS/OTS) program, the qualified amount is $2000. In an embodiment, if the applicant 115 is in a pre-commission program and in an Reserve Officers' Training Corps (ROTC) program, the qualified amount varies depending on the applicants 115 classification such as, for example: $500 for freshman, $1000 for sophomore, $1500 for junior, $2000 for senior, and $2500 for an officer.

In an embodiment, if the applicant 115 is in a college program, the qualified amount varies depending on the applicants 115 classification such as, for example: $500 for freshman, $750 for sophomore, $1000 for junior, and $1500 for senior. In an embodiment, if the applicant 115 is pre-approved with a credit score greater than 580, the qualified amount is $500. In an embodiment, if the applicant is not pre-approved and has a credit score greater than 630, the qualified amount is $500.

In an embodiment, if the applicant 115 has a credit score between 790 and 850, the maximum credit amount is $25000. In an embodiment, if the applicant 115 has a credit score between 760 and 789, the maximum credit amount is $25000 if the applicant is pre-approved and $20000 if the applicant is not pre-approved. In an embodiment, if the applicant 115 has a credit score between 720 and 759, the maximum credit amount is $25000 if the applicant is pre-approved and $15000 if the applicant is not pre-approved. In an embodiment, if the applicant 115 has a credit score between 680 and 719, the maximum credit amount is $25000 if the applicant is pre-approved and $10000 if the applicant is not pre-approved. In an embodiment, if the applicant 115 has a credit score between 660 and 679, the maximum credit amount is $25000 if the applicant is pre-approved and $5000 if the applicant is not pre-approved. In an embodiment, if the applicant 115 has a credit score between 630 and 659, the maximum credit amount is $25000 if the applicant is pre-approved and $2000 if the applicant is not pre-approved. In an embodiment, if the applicant 115 has a credit score between 580 and 629, the maximum credit amount is $1000 if the applicant is pre-approved and $500 if the applicant is not pre-approved. In an embodiment, if the applicant 115 has a credit score under 580, the maximum credit amount is $500.

The method 200 then proceeds to step 206f where the information provided by the applicant 115 in the credit request application and any information about the applicant 115 which may have been retrieved from the applicant database 110c in step 204 of the method 200 are run through the plurality of review rules. In an embodiment, if the applicants 115 primary address in the credit request application and the address in the credit report does not match when one of the addresses is in California, the credit request application is marked a fraud risk. In an embodiment, if the applicant 115 is potentially Office of Foreign Assets Control (OFAC) positive, the credit request application is marked a fraud risk. In an embodiment, if the applicant 115 has another submitted credit request application, the credit request application is marked a fraud risk. In an embodiment, if the applicant 115 has been a member of the providers 110 membership organization and has had their member number rescinded, the credit request application is marked a fraud risk. In an embodiment, if the credit request application is missing a social security number, a first name, a last name, a date of birth, and/or a primary address, the credit request application is marked a fraud risk.

In an embodiment, even if the credit request application is approved for a certain amount, the credit application request may be sent for review for a number of reasons, such as, for example, if the applicant 115 requests to qualify for an amount which is greater than the approved amount, if the total balance transfers is greater than the approved amount, if the approved amount is greater than 200% of the greatest revolving tradeline, and/or if the applicant 115 has had a credit request application within the past 6 months.

In an embodiment, even if the credit request application is denied, the credit request application may be sent for review for a number of reasons, such as, for example, if the applicant 115 has been a member of the providers 110 membership organization for 20 years or more, if the sum of all the applicants 115 assets with the provider are $25000 or greater, if the applicant is in a pre-commission program, if the applicant 115 has responded to a pre-approval offer from the provider 110, if the applicant 115 has applied for a college program with the provider 110, and/or if the applicant 115 is Bank Property and Casualty eligible and has a credit score greater than or equal to 580. In an embodiment, Bank Property and Casualty eligibility is only provided to members of the providers 110 membership organization and indicates to the provider 110 that the applicant 115 is a relatively lower risk for offering credit than someone whom is not Bank Property and Casualty eligible.

The method 200 then proceeds to step 206g where the information provided by the applicant 115 in the credit request application and any information about the applicant 115 which may have been retrieved from the applicant database 110c in step 204 of the method 200 are run through the plurality of pricing rules. In an embodiment, the pricing of the credit account may be determined by a number of things such as, for example, the type of program the applicant 115 is in (e.g. a college program, a pre-commission program, a pre-approval program, or no program.), the applicant's 115 credit score, and/or a type of rewards program that the applicant 115 is in with the provider 110.

The method 200 then proceeds to step 206h where the information provided by the applicant 115 in the credit request application and any information about the applicant 115 which may have been retrieved from the applicant database 110c in step 204 of the method 200 are run through the plurality of decision authority rules. In an embodiment, the required approval authority of an underwriter used to approve the credit application request will change depending on the status of the applicant 115, and that required approval authority is determined in step 206h.

The method 200 then proceeds to step 206i where the information provided by the applicant 115 in the credit request application and any information about the applicant 115 which may have been retrieved from the applicant database 110c in step 204 of the method 200 are run through the plurality of user approval authorization check rules. In an embodiment, if the approved amount is greater than the requested amount, the credit request application is denied. In an embodiment, if the approved amount is greater than the applicants 115 lending limit, the credit request application is denied. In an embodiment, if the approved amount plus the unsecured aggregate the applicant 115 has with the provider 110 is greater than the applicants 115 lending limit, the credit request application is denied.

The method 200 then proceeds to decision block 208 where it is determined whether the applicants 115 credit request application is flagged for review. During the processing of the credit request application in step 206 of the method 200, the processing of the information provided by the applicant 115 in the credit request application and any information about the applicant 115 which may have been retrieved from the applicant database 110c in step 204 of the method 200 through the series of rules provides a determination of whether the applicant 115 is a risk for fraud and/or needs to be reviewed. If it is determined that the applicant 115 is a risk for fraud and/or needs to be reviewed, the method 200 proceeds to step 210 where the credit request application is referred for review. The applicant 115 is immediately informed that the credit request application has been referred for review and that an immediately useable general use credit account may not be issued. However, a general use credit account may be issued to the applicant 115 at a time following the credit application session. The referral of the credit request application at step 210 of the method 200 results in the end of the credit application session between the provider 110 and the applicant 115 which began at step 202 of the method 200.

If, at decision block 208, it is determined that the credit request application is not a risk for fraud and/or does not need to be reviewed, the method 200 proceeds to decision block 212 where it is determined whether the credit request application is approved. During the processing of the credit request application in step 206 of the method 200, the processing of the information provided by the applicant 115 in the credit request application and any information about the applicant 115 which may have been retrieved from the applicant database 110c in step 204 of the method 200 through the series of rules provides a determination of whether the credit request application is approved. If it is determined that the credit request application is not approved, the method 200 proceeds to step 214 where the credit request application is denied. The applicant 115 is immediately informed that the credit request application has been denied and that an immediately usable general use credit account may not be issued. The denial of the credit request application at step 214 of the method 200 may result in the end of the credit application session between the provider 110 and the applicant 115 which began at step 202 of the method 200.

If, at decision block 212, it is determined that that the credit request application is approved, the method 200 proceeds to step 216 where the applicant 115 is supplied with a plurality of general use credit account information. In an exemplary embodiment, upon approval of the credit request application, the applicant 115 is supplied with a credit account number, a credit account expiration date, and a credit account security code, such that the applicant 115 is in possession of the necessary information needed to immediately charge purchases, from the provider 110 or any other entity offering products and/or service for purchase on credit, to a general use credit account corresponding to the credit account number, the credit account expiration date, and the credit account security code. The general use credit account is defined as a credit account for which there are no restrictions by the credit provider 110 relating to which entities purchases on the general use credit account may be made from. The approval of the credit request application and the provision of credit account information at step 216 of the method 200 results in the end of the credit application session between the provider 110 and the applicant 115 which began at step 202 of the method 200. Thus, a system and method are provided which allow a request for a general use credit account and the provision of immediately usable credit information within a credit application session, the credit application session defined as a period of continuous contact with the applicant 115 beginning with the credit request at step 202 of the method 200 and ending with one of either issuing the applicant 115 a general use credit account and supplying the applicant with credit information at step 216 of the method 200, or denying the applicant 115 for an immediately useable general use credit account at steps 210 or 214.

Figure 4B:
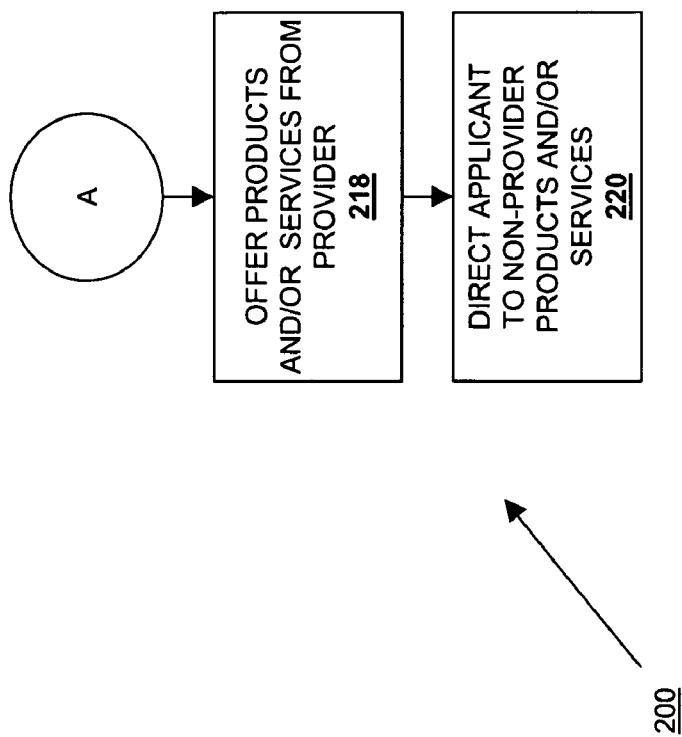
FIG. 4b is a flow chart illustrating an embodiment of a portion of a method for providing credit.
Figure 4C:
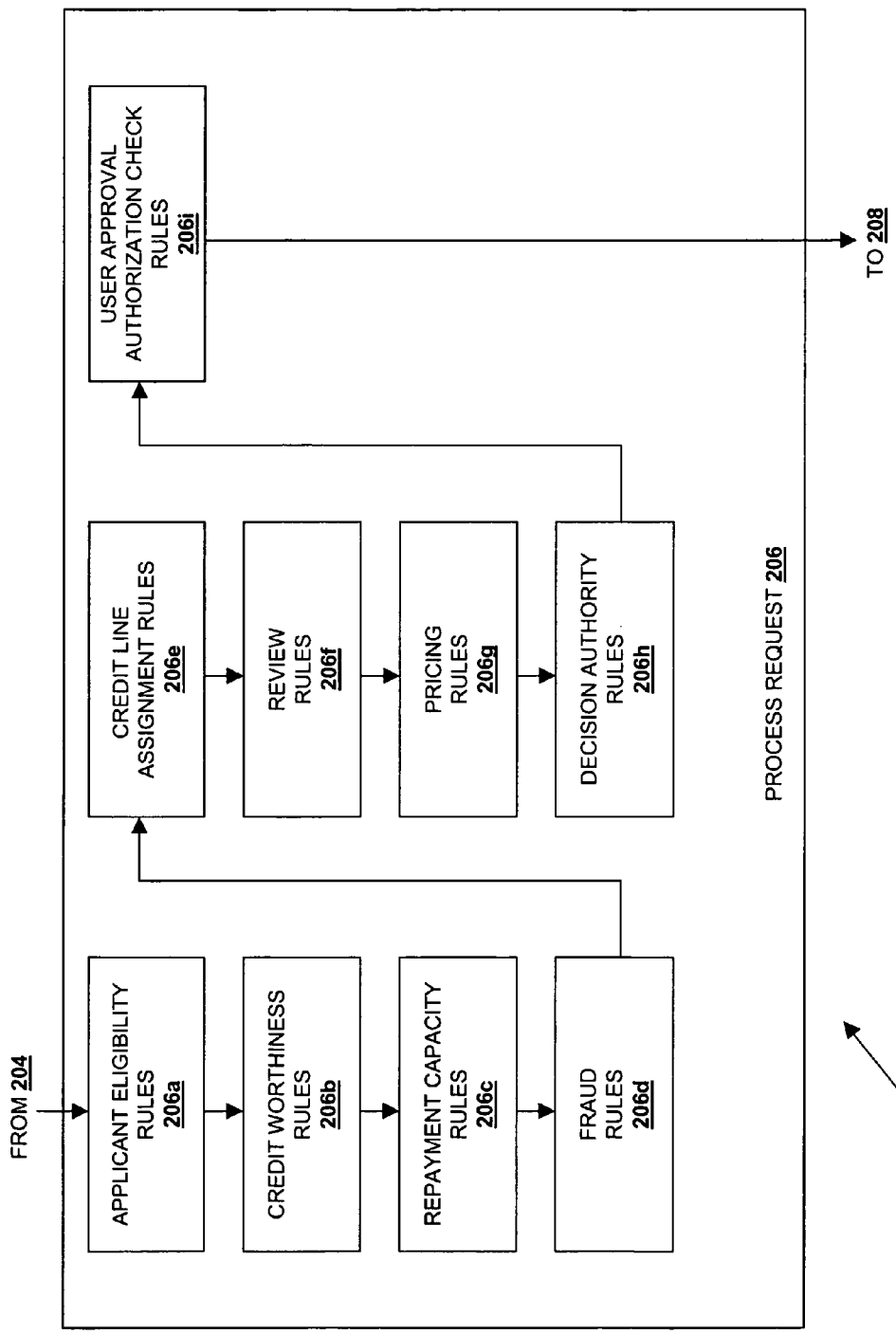
FIG. 4c is a flow chart illustrating an embodiment of a portion of a method for providing credit.

Referring now to FIGS. 1a and 4b, the method 200 then proceeds to step 218 where products and/or services are offered from the provider 110. Through the network 105, the provider 110 may offer the applicant 115 products and/or services which the applicant 115 may purchase by supplying the credit account information for the general use credit account acquired during the credit application session. The method 200 then proceeds to step 220 where the provider 110 directs the applicant 115 to an entity other than the provider 110 to be offered products and/or services. Through the network 105, the entity other than the provider 110 may offer the applicant 115 products and/or services which the applicant 115 may purchase by supplying the credit account information for the general use credit account acquired during the credit application session, as there may be no restrictions by the credit provider 110 relating to which entities purchases on the general use credit account may be made from.

Figure 5:
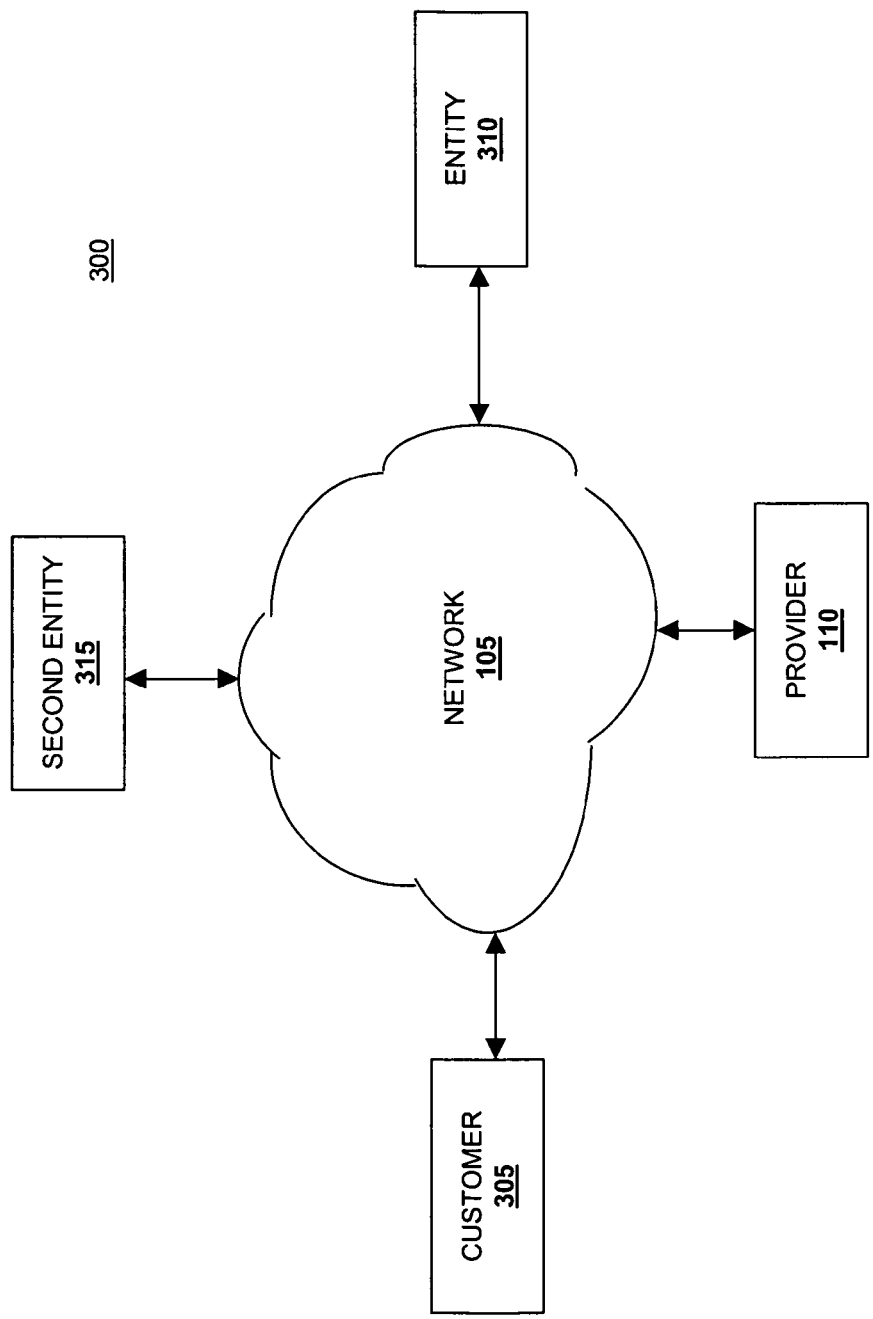
FIG. 5 is a schematic view illustrating an embodiment of a system for providing products and/or services on credit and a system for acquiring credit.

Referring now to FIG. 5, in an alternative embodiment, a system for providing products and/or services on credit 300 is substantially similar in design and operation to the system for providing credit 100, described above with reference to FIG. 1a, with the provision of a customer 305 operably coupled to the network 105 in place of the applicant 115, an entity 310 operably coupled to the network 105 in place of the applicant 120, and a second entity 315 operably coupled to the network 105 in place of the applicant 125. In an embodiment, the system 300 operates in substantially the same manner as described above for the system 100, and any or all of the provider 110, the customer 305, the entity 310, and the second entity 315 may include an information handling system such as, for example, the information handling system 130, described above with reference to FIG. 1b.

Figure 6:
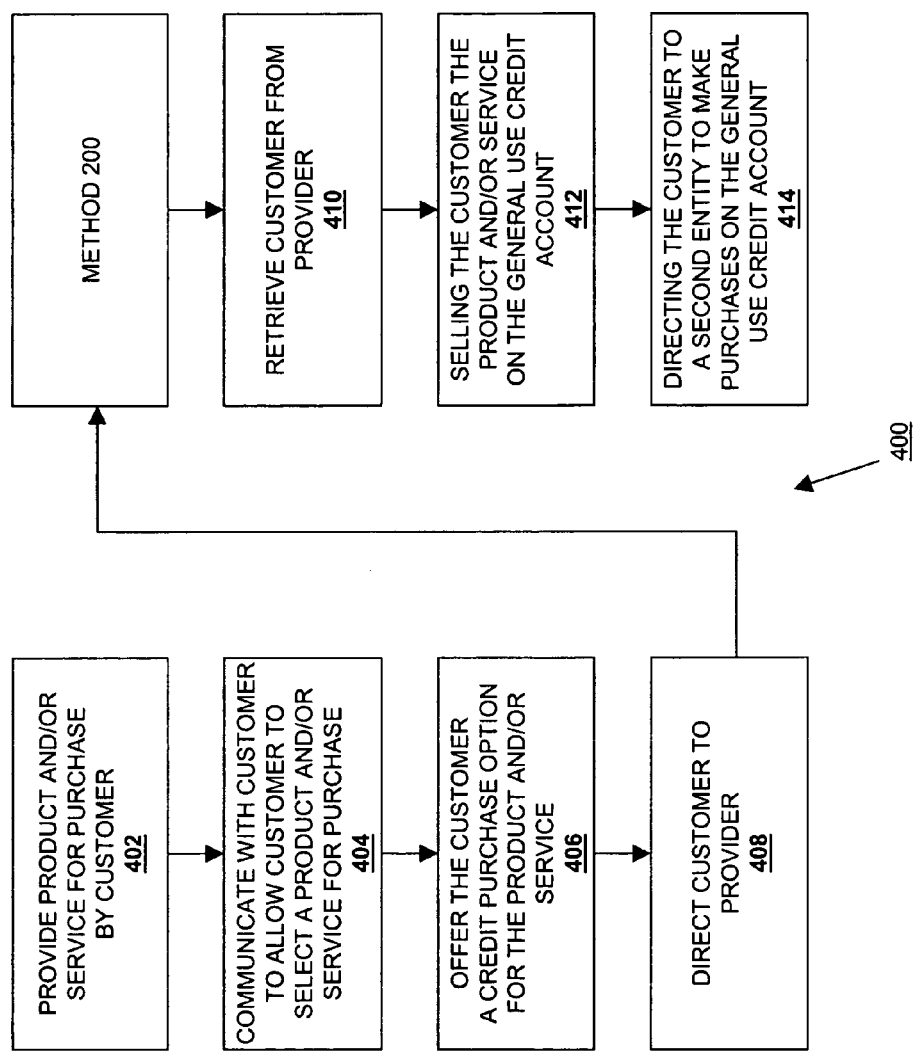
FIG. 6 is a flow chart illustrating an embodiment of a method for providing products and/or services on credit.

Referring now to FIGS. 5 and 6, a method for providing products and/or services on credit 400 is illustrated. The method 400 begins at step 402 where the entity 310 provides a product and/or a service for purchase by the customer 305. The method 400 then proceeds to step 404 where the entity 310 communicates with the customer 305 to allow the customer 305 to select a product and/or service for purchase. In an embodiment, the entity 310 may communicate with the customer 305 through the network 105 using, for example, information handling systems such as the information handling system 130, described above with reference to FIG. 1b, phones, fax machines, face-to-face communication, and/or a variety of other communication techniques known in the art. Upon communication between the entity 310 and the customer 305, the customer 205 selects a product and/or service for purchase.

The method 400 then proceeds to step 406 where the entity 310 offers the customer 305 a credit purchase option which allows the customer 305 to attempt to acquire a general use credit account with which to purchase the product and/or service. In an embodiment, the entity 310 may offer the customer 305 a plurality of different credit providers such as, for example, the provider 110, with which to acquire a general use credit account, and the customer 305 selects one of the credit providers such as, for example, the provider 110. The method 400 then proceeds to step 408 where the customer 305 is directed to the provider 110 in order to submit a credit request application. The customer 305 may be put in contact with the provider 110 in a variety of ways such as, for example, through the network 105 using, for example, information handling systems such as the information handling system 130, described above with reference to FIG. 1b, through phone communication, fax communication, face-to-face communication, and/or a variety of other communication techniques known in the art. The method 400 then proceeds to step 202 of the method 200, described above with respect to FIGS. 4a, 4b, and 4c, in which the customer 305 is treated in substantially the same manner as the applicant 115 and which results in the customer 305 either receiving an immediately useable general use credit account from the provider 110 or the customer 305 being denied the immediately useable general use credit account from the provider 110.

The method 400 then proceeds to step 410 where the entity 310 retrieves the customer 305 from the provider 110. If the customer 305 received the general use credit account from the provider 110, the method proceeds to step 412 where the customer 305 is sold the product and/or service on the general use credit account. Furthermore, the customer 305 may be cross-sold a cross-sell product and/or a cross-sell service on the general use credit account which are related to the product and/or service purchased on the general use credit account. The method 400 then proceeds to step 414, where the customer 305 is directed to the second entity 315 in order to make purchases on the general use credit account. The customer 305 may be put in contact with the second entity 315 in a variety of ways such as, for example, through the network 105 using, for example, information handling systems such as the information handling system 130, described above with reference to FIG. 1b, through phone communication, fax communication, face-to-face communication, and/or a variety of other communication techniques known in the art.

Figure 7:
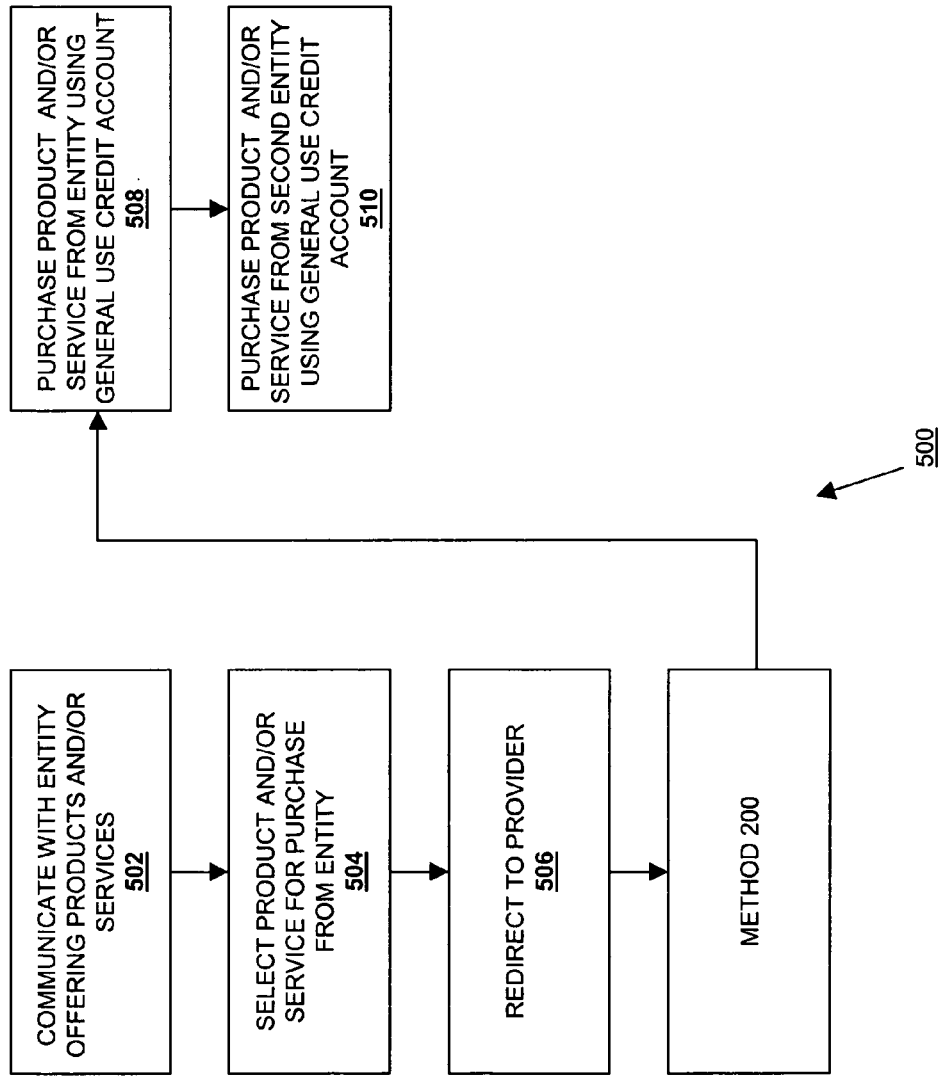
FIG. 7 is a flow chart illustrating an embodiment of a method for acquiring credit.

Referring now to FIGS. 5 and 7, a method for acquiring credit 500 is illustrated. The method 500 begins at step 502 where the customer 305 communicates with the entity 310 which is offering products and/or services. In an embodiment, the customer 305 may communicate with the entity 310 through the network 105 using, for example, information handling systems such as the information handling system 130, described above with reference to FIG. 1b, phones, fax machines, face-to-face communication, and/or a variety of other communication techniques known in the art. The method 500 then proceeds to step 504 where the customer 305 selects a product and/or a service for purchase from the entity 310. Upon selecting a product and/or service for purchase from the entity 310, the customer 305 is offered an option to apply for a general use credit account to use for the purchase of the product and/or service. In an embodiment, the customer 305 may choose from a plurality of credit providers such as, for example, the provider 110, in order to acquire the general use credit account.

The method 500 then proceeds to step 506 where the customer 305 redirects to the provider 110. The method 500 then proceeds to step 202 of the method 200, described above with respect to FIGS. 4a, 4b, and 4c, in which the customer 305 is treated in substantially the same manner as the applicant 115 and which results in the customer 305 either receiving an immediately useable general use credit account from the provider 110 or the customer 305 being denied the immediately useable general use credit account from the provider 110. If the customer 305 receives the general use credit account, the method 500 proceeds to step 508 where the customer 305 purchases the products and/or services from the entity 310 using the general use credit account. The method 500 then proceeds to step 510 where the customer 305 purchases products and/or services from the second entity 315 with the general use credit account. In an embodiment, the customer 305 may communicate with the second entity 315 through the network 105 using, for example, information handling systems such as the information handling system 130, described above with reference to FIG. 1b, phones, fax machines, face-to-face communication, and/or a variety of other communication techniques known in the art.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system for acquiring credit comprising:
an information collecting device configured to collect information based on interactions between a credit provider and a member, wherein the credit provider and the member belong to a membership organization;
a first information handling subsystem to connect to a second information handling subsystem of the credit provider through a network to provide a request from the member for a general use credit account provided by the credit provider, wherein the credit provider has a membership relationship with the member prior to the request for the general use credit account;
a request collection engine coupled to the second information handling subsystem for beginning a credit application session, whereby the credit application session is a period of continuous contact between the first information handling subsystem and the second information handling subsystem of the credit provider through the network; and
a request processing engine coupled to the request collection engine, the request processing engine configured to direct a computer processor to:
determine whether to grant or deny the general use credit account provided by the credit provider during the credit application session, wherein the determining to grant or deny includes the request processing engine using previously collected information about the member requesting the general use credit account that was supplied to the credit provider based on interactions between the credit provider and the member prior to the credit application session, wherein the determining to grant or deny indicates that the general use credit account is to be initially denied;
wherein upon initial denial of the general use credit account based on the determining to grant or deny indication, review the previously collected information about the member, wherein the previously collected information indicates that the member falls under a category of a pre-commission program in a Reserve Officers' Training Corps (ROTC) program, an Officers Candidate School/Officers Training School (OCS/OTS) program, or a military academy;
grant the general use credit account to the member after the review of the previously collected information indicates that the member falls under the category of a pre-commission program in a Reserve Officers' Training Corps (ROTC) program, an Officers Candidate School/Officers Training School (OCS/OTS) program, or a military academy;
wherein the previously collected information used by the request processing engine includes an indicator as to whether the member requesting the general use credit account has caused the credit provider a previous loss.

2. The system of claim 1, further comprising:
a third information handling subsystem for connecting to an entity offering at least one of a product and a service through the network using the first information handling subsystem;
the first information handling subsystem including at least one subsystem for purchasing the at least one of the product and the service using the general use credit account; and
the first information handling subsystem including at least one subsystem for redirecting to the second information handling subsystem of the credit provider from the third information handling subsystem of the entity.

3. The system of claim 1, wherein the first information handling subsystem further comprises at least one subsystem for selecting at least one of a product and a service for purchase.

4. The system of claim 1, wherein the first information handling subsystem further comprises at least one subsystem for purchasing at least one of a product and a service with the general use credit account.

5. The system of claim 1, wherein the first information handling subsystem further comprises at least one subsystem for:
purchasing at least one of a product and a service from a first entity with the general use credit account through the network; and
purchasing at least one of a product and a service from a second entity with the general use credit account through the network.

6. The system of claim 1, wherein the first information handling subsystem further comprises at least one subsystem for:
providing a plurality of information to the second information handling subsystem of the credit provider.

7. A method for acquiring credit, the method comprising:
collecting information based on interactions between a credit provider and a member, wherein the credit provider and the member belong to a membership organization;
connecting to the credit provider through a network using a plurality of information handling subsystems to request for the member a general use credit account provided by the credit provider, wherein the credit provider has a membership relationship with the member prior to the request for the general use credit account;
beginning a credit application session with a request collection engine that is coupled to one of the plurality of information handling subsystems, whereby the credit application session is a period of continuous contact with the credit provider;
processing data by a processor including or configured with a request processing engine coupled to one of the information handling subsystems, the request processing engine using the previously collected information to determine whether to grant or deny the general use credit account during the credit application session, wherein the determining includes using previously collected information about the member requesting the general use credit account that was supplied to the credit provider based on interactions between the credit provider and the member prior to the credit application session;

wherein the determining to grant or deny indicates that the general use credit account is to be initially denied; wherein upon the initial denial of the general use credit account based on the determining to grant or deny indication, review the previously collected information about the member, wherein the previously collected information indicates that the member falls under a category of a pre-commission program in a Reserve Officers' Training Corps (ROTC) program, an Officers Candidate School/Officers Training School (OCS/OTS) program, or a military academy;

granting the general use credit account to the member after the review of the previously collected information indicates that the member falls under the category of a pre-commission program in a Reserve Officers' Training Corps (ROTC) program, an Officers Candidate School/Officers Training School (OCS/OTS) program, or a military academy;

wherein the previously collected information used by the request processing engine includes an indicator as to whether the member requesting the general use credit account has caused the credit provider a previous loss.

8. The method of claim 7, further comprising:

connecting through the network to an information handling subsystem of an entity offering at least one of a product and a service;

purchasing the at least one of the product and the service through the network using the general use credit account; and redirecting to the credit provider from the entity through the network.

9. The method of claim 7, further comprising:

selecting at least one of a product and a service for purchase using one of the plurality of information handling subsystems.

10. The method of claim 7, further comprising:

purchasing at least one of a product and a service with the general use credit account using one of the plurality of information handling subsystems.

11. The method of claim 7, further comprising:

purchasing at least one of a product and a service from a first entity with the general use credit account though the network; and purchasing at least one of a product and a service from a second entity with the general use credit account through the network.

12. The method of claim 7, further comprising:

providing a plurality of information to the credit provider through the network using the plurality of information handling subsystems systems.

13. A non-transitory computer-readable medium comprising computer-readable instructions for acquiring credit, said computer-readable instructions, when executed by a computer, causing the computer to:

collect information based on interactions between a credit provider and a member, wherein the credit provider and the member belong to a membership organization;

connect to the credit provider to request for the member a general use credit account provided by the credit provider, wherein the credit provider has a membership relationship with the member prior to the request for the general use credit account;

begin a credit application session, whereby the credit application session is a period of continuous contact with the credit provider;

determine whether to grant or deny the general use credit account provided by the credit provider during the credit application session, wherein the determining includes using previously collected information about the member requesting the general use credit account that was supplied to the credit provider based on interactions between the credit provider and the member prior to the credit application session;

wherein the determining to grant or deny indicates that the general use credit account is to be initially denied; wherein upon the initial denial of the general use credit account based on the determining to grant or deny indication, review the previously collected information about the member, wherein the previously collected information indicates that the member falls under a category of a pre-commission program in a Reserve Officers' Training Corps (ROTC) program, an Officers Candidate School/Officers Training School (OCS/OTS) program, or a military academy; and grant the general use credit account to the member after the review of the previously collected information indicates that the member falls under the category of a pre-commission program in a Reserve Officers' Training Corps (ROTC) program, an Officers Candidate School/Officers Training School (OCS/OTS) program, or a military academy;

wherein the previously collected information used by the request processing engine includes an indicator as to whether the member requesting the general use credit account has caused the credit provider a previous loss.

14. The computer-readable medium of claim 13, wherein the computer-readable instructions, when executed by the computer, further cause the computer to:

connect to an entity offering at least one of a product and a service;

purchase the at least one of the product and the service using the general use credit account; and redirect to the credit provider from the entity.

15. The computer-readable medium of claim 13, wherein the computer-readable instructions, when executed by the computer, further cause the computer to:

select at least one of a product and a service for purchase.

16. The computer-readable medium of claim 13, wherein the computer-readable instructions, when executed by the computer, further cause the computer to:

purchase at least one of a product and a service with the general use credit account.

17. The computer-readable medium of claim 13, wherein the computer-readable instructions, when executed by the computer, further cause the computer to:

purchase at least one of a product and a service from a first entity with the general use credit account; and purchase at least one of a product and a service from a second entity with the general use credit account.

18. The computer-readable medium of claim 13, wherein the computer-readable instructions, when executed by the computer, further cause the computer to provide a plurality of information to the credit provider.

* * * * *